United States Patent
Koontz et al.

(10) Patent No.: US 8,955,858 B2
(45) Date of Patent: Feb. 17, 2015

(54) TRACTION CONTROL APPARATUS AND METHOD FOR A TANDEM AXLE SYSTEM

(71) Applicant: Ridewell Corporation, Springfield, MO (US)

(72) Inventors: Matthew Koontz, Ozark, MO (US); William Mattocks, Elkland, MO (US); Jason Dillard, Springfield, MO (US)

(73) Assignee: Ridewell Corporation, Springfield, MO (US)

( * ) Notice: Subject to any disclaimer, the term of this patent is extended or adjusted under 35 U.S.C. 154(b) by 0 days.

(21) Appl. No.: 14/105,732

(22) Filed: Dec. 13, 2013

(65) Prior Publication Data

US 2014/0167378 A1    Jun. 19, 2014

Related U.S. Application Data

(60) Provisional application No. 61/737,544, filed on Dec. 14, 2012.

(51) Int. Cl.
| | | |
|---|---|---|
| *B62D 61/12* | (2006.01) | |
| *B60W 30/02* | (2012.01) | |
| *B60G 5/02* | (2006.01) | |
| *B60G 17/052* | (2006.01) | |

(52) U.S. Cl.
CPC .............. *B60W 30/02* (2013.01); *B60G 5/02* (2013.01); *B60G 17/0526* (2013.01); *B60G 2200/318* (2013.01); *B60G 2200/341* (2013.01); *B60G 2200/346* (2013.01); *B60G 2200/42* (2013.01); *B60G 2200/422* (2013.01); *B60G 2204/126* (2013.01); *B60G 2206/601* (2013.01); *B60G 2300/0262* (2013.01); *B60G 2800/182* (2013.01)

USPC ..................................... 280/86.5; 280/124.11

(58) Field of Classification Search
USPC ........ 280/6.157, 86.5, 676, 678, 683, 124.11, 280/378; 180/24.01
See application file for complete search history.

(56) References Cited

U.S. PATENT DOCUMENTS

| | | | | |
|---|---|---|---|---|
| 2,998,261 | A | * | 8/1961 | Bartlett ........................ 280/81.1 |
| 3,053,335 | A | * | 9/1962 | Ewald et al. ................. 280/81.1 |
| 3,096,995 | A | * | 7/1963 | Richnow, Jr. .............. 180/24.02 |
| 3,380,336 | A | | 4/1968 | Bilas |
| 3,600,044 | A | | 8/1971 | Cushman |
| 3,685,853 | A | | 8/1972 | Goldsmith |
| 3,870,336 | A | * | 3/1975 | Bilas ............................ 280/86.5 |
| 3,877,715 | A | | 4/1975 | Thayer et al. |
| 3,881,565 | A | | 5/1975 | Parrish |
| 4,063,779 | A | | 12/1977 | Martin et al. |
| 4,256,326 | A | * | 3/1981 | Cantrell et al. ............. 280/86.5 |
| 4,390,187 | A | * | 6/1983 | Maeda ....................... 280/6.159 |
| 4,462,477 | A | | 7/1984 | Mastro |
| 4,697,659 | A | | 10/1987 | Zimmerman |
| 4,740,005 | A | | 4/1988 | Babin |
| 4,854,409 | A | * | 8/1989 | Hillebrand et al. ........ 180/24.02 |
| 4,944,526 | A | * | 7/1990 | Eberling ...................... 280/86.5 |

(Continued)

*Primary Examiner* — Paul N Dickson
*Assistant Examiner* — Robert A Coker
(74) *Attorney, Agent, or Firm* — Lathrop & Gage LLP

(57) ABSTRACT

A traction assist system for a vehicle having a tandem-axle system includes a drive axle and a non-drive axle attached to a suspension beam on opposite sides of a pivot about which the suspension beam is rotatable. A device selectively applies a force to the suspension beam on the side of the pivot at which the drive axle is attached, such that the suspension beam tends to rotate to provide a downward force on the drive axle. The device can also apply the downward force directly to the drive axle.

17 Claims, 18 Drawing Sheets

(56) References Cited

U.S. PATENT DOCUMENTS

| | | | |
|---|---|---|---|
| 4,993,729 A * | 2/1991 | Payne | 280/81.1 |
| 6,523,625 B2 * | 2/2003 | Eberling et al. | 180/24.02 |
| 6,916,037 B2 * | 7/2005 | Baxter et al. | 280/683 |
| 6,921,100 B2 | 7/2005 | Mantini et al. | |
| 7,178,824 B2 * | 2/2007 | Ziech | 280/678 |
| 7,841,608 B2 | 11/2010 | Morris et al. | |
| 2002/0074746 A1 * | 6/2002 | Eberling et al. | 280/5.5 |
| 2003/0209872 A1 * | 11/2003 | Baxter et al. | 280/124.128 |
| 2006/0208464 A1 | 9/2006 | Raidel, II et al. | |

* cited by examiner

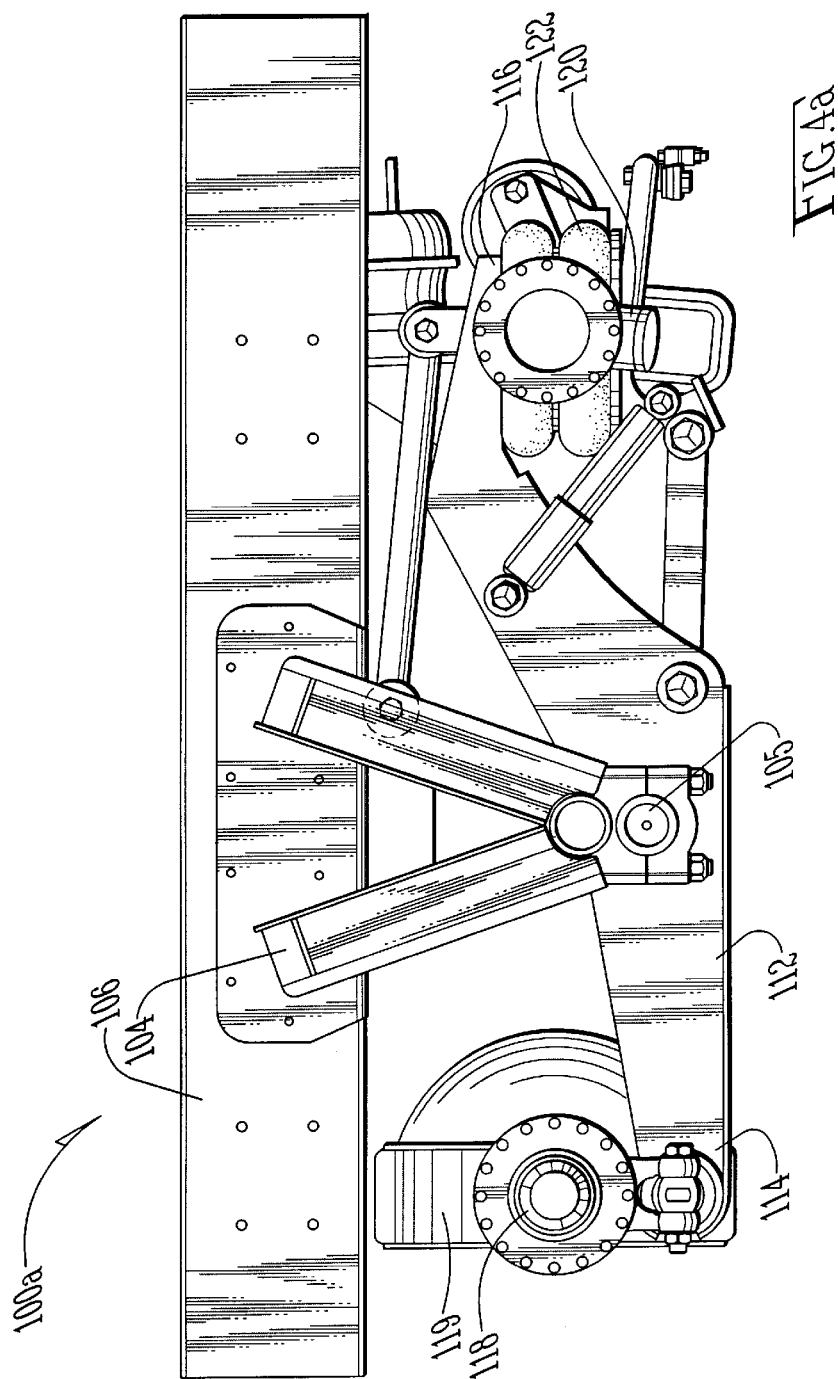

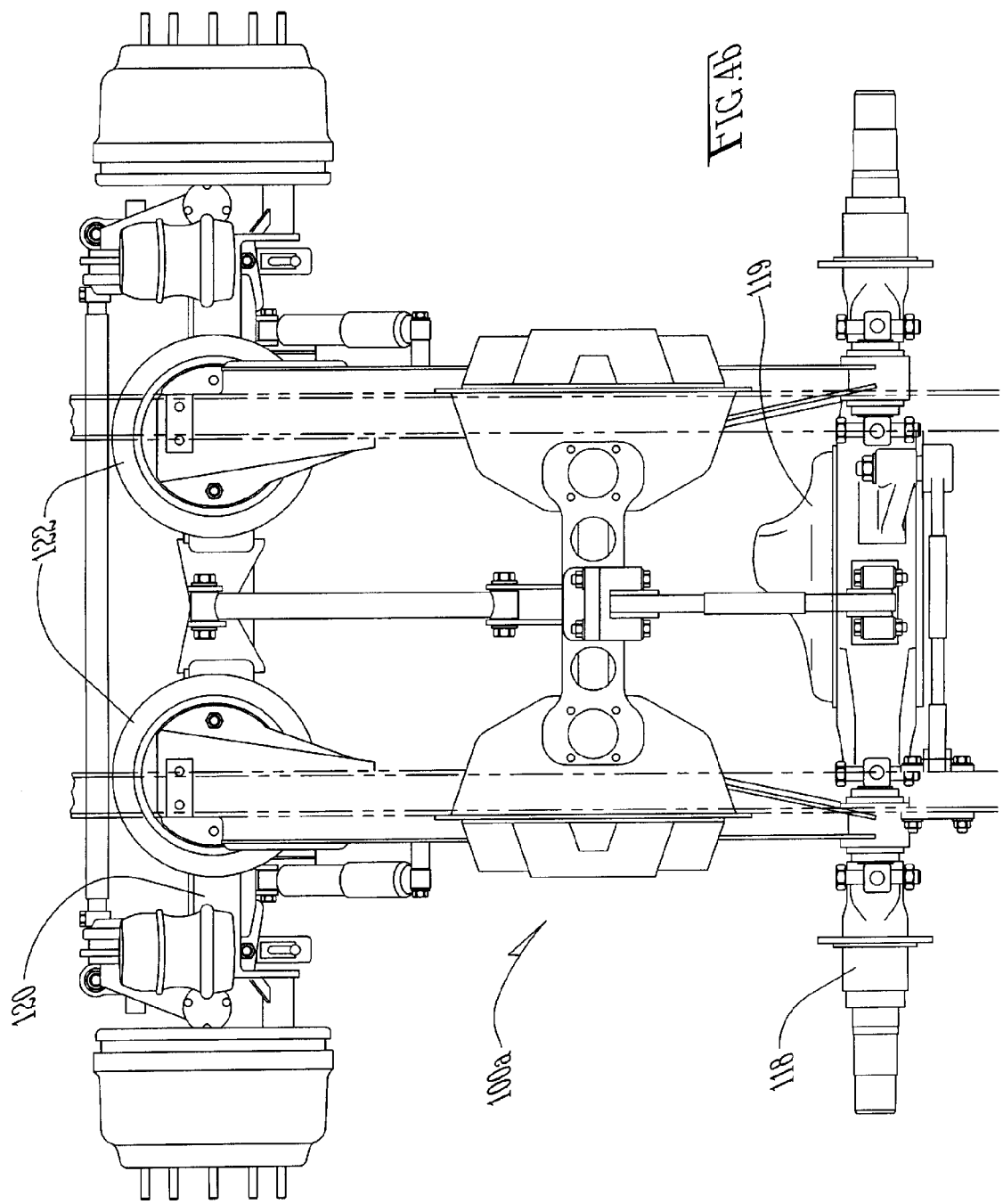

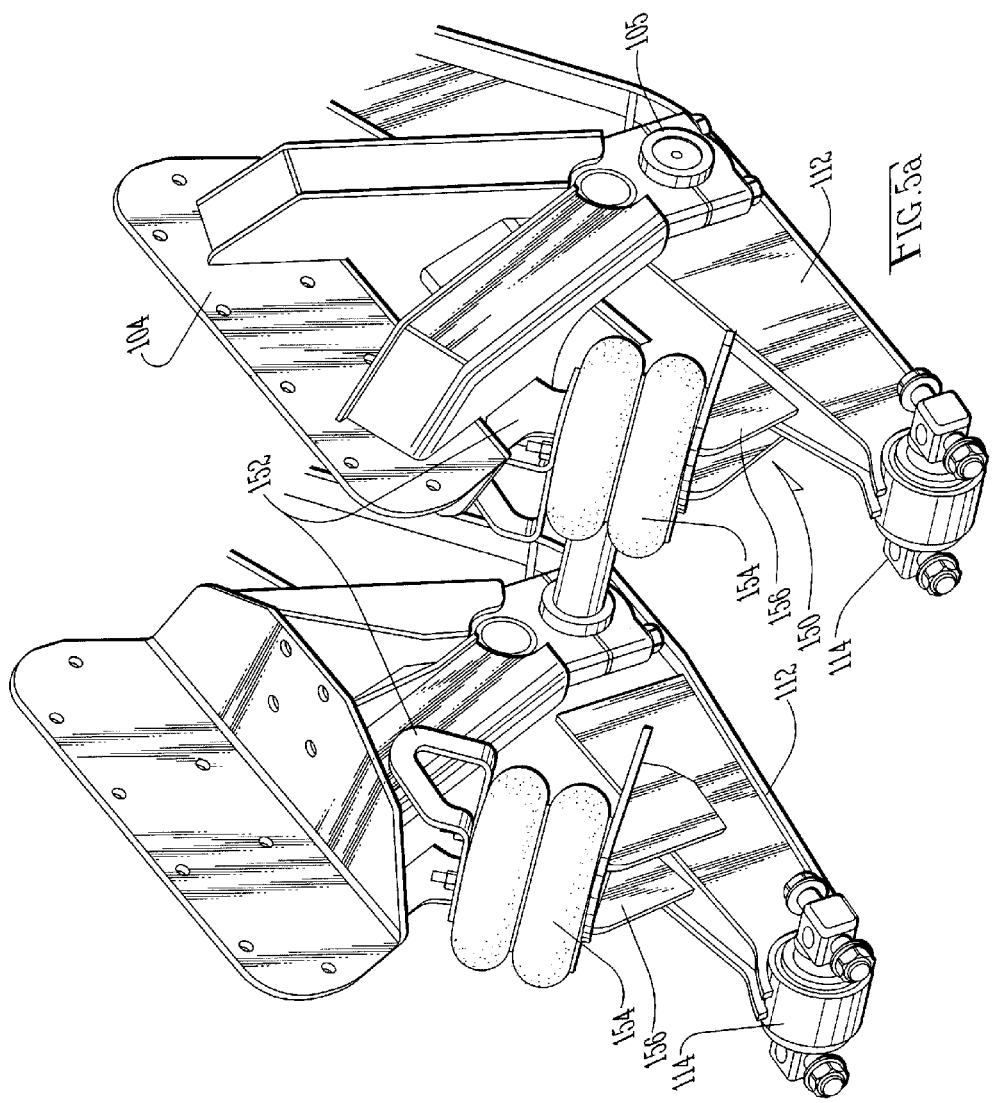

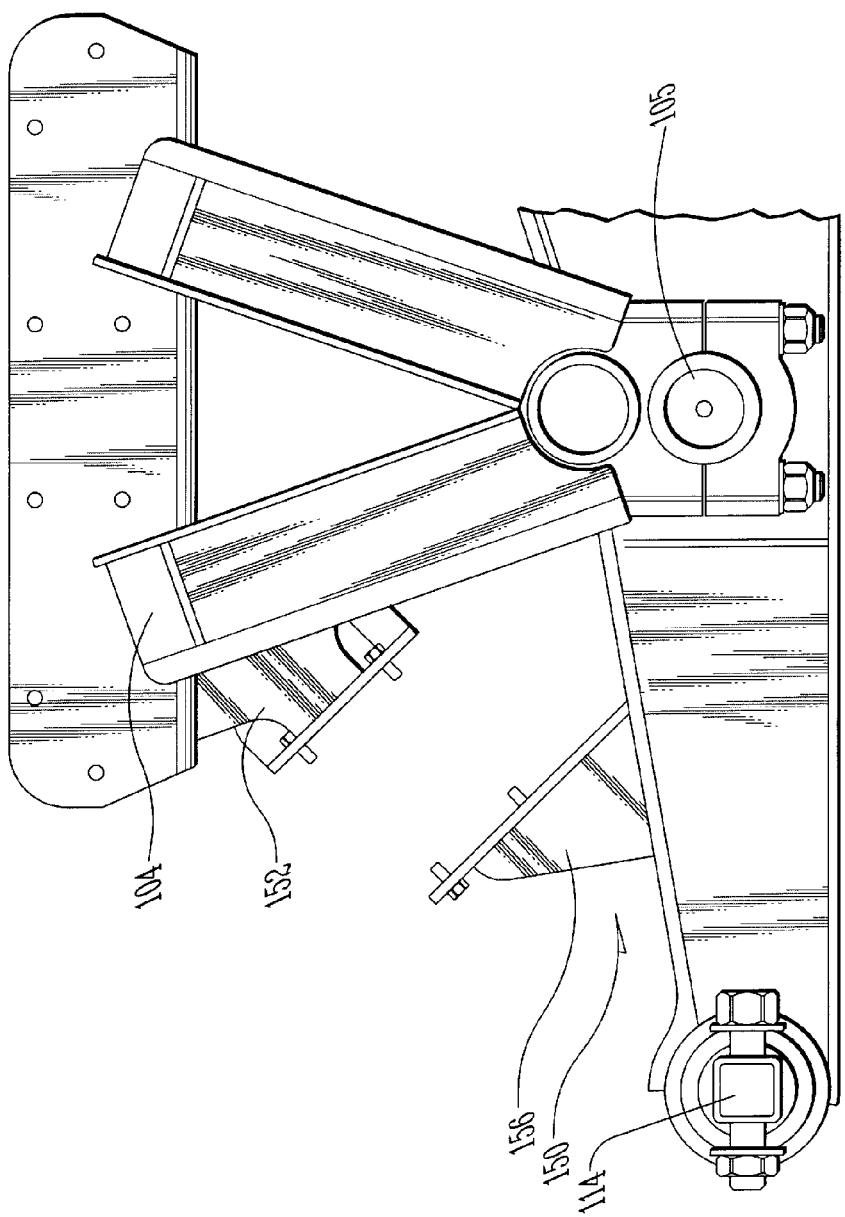

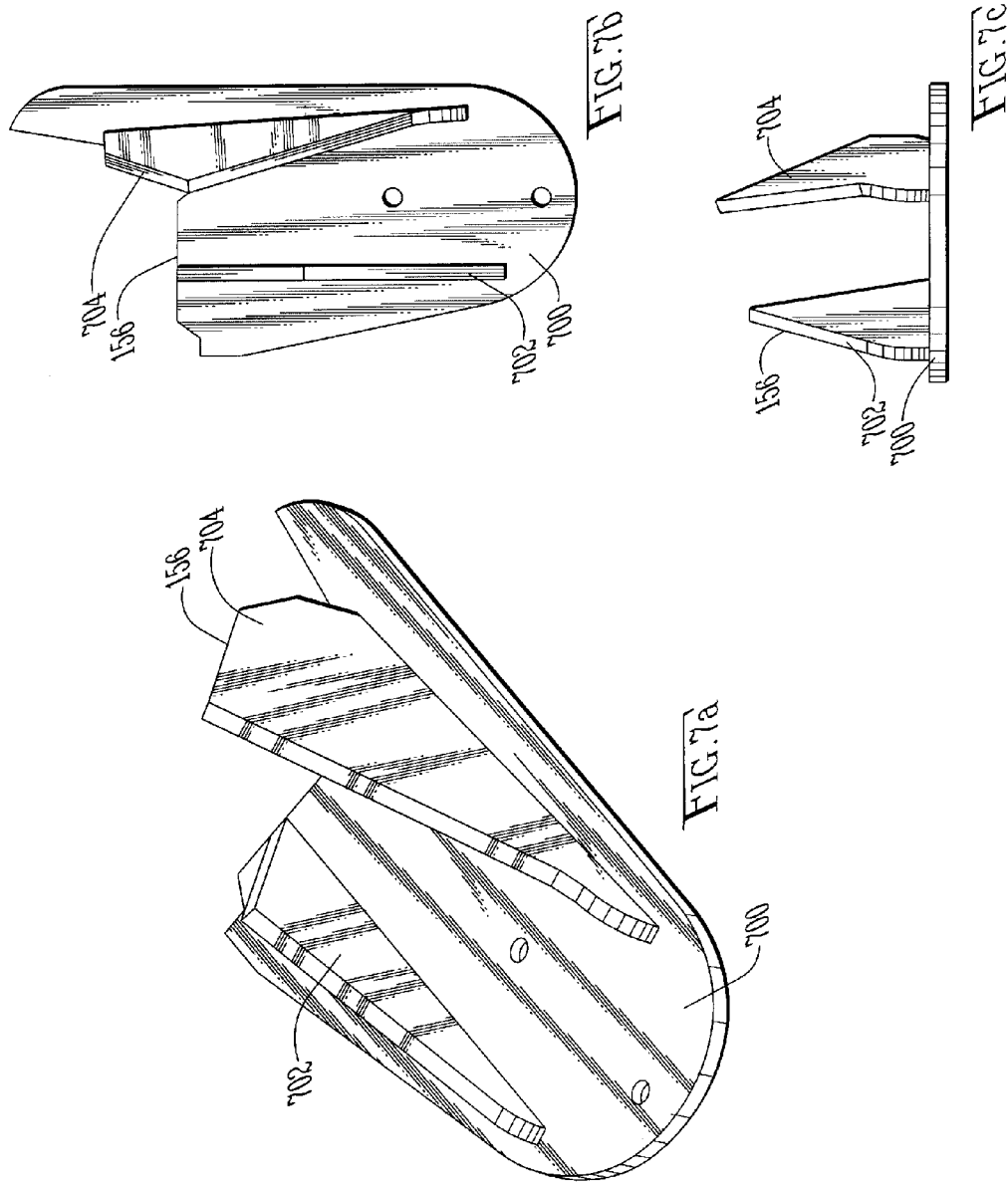

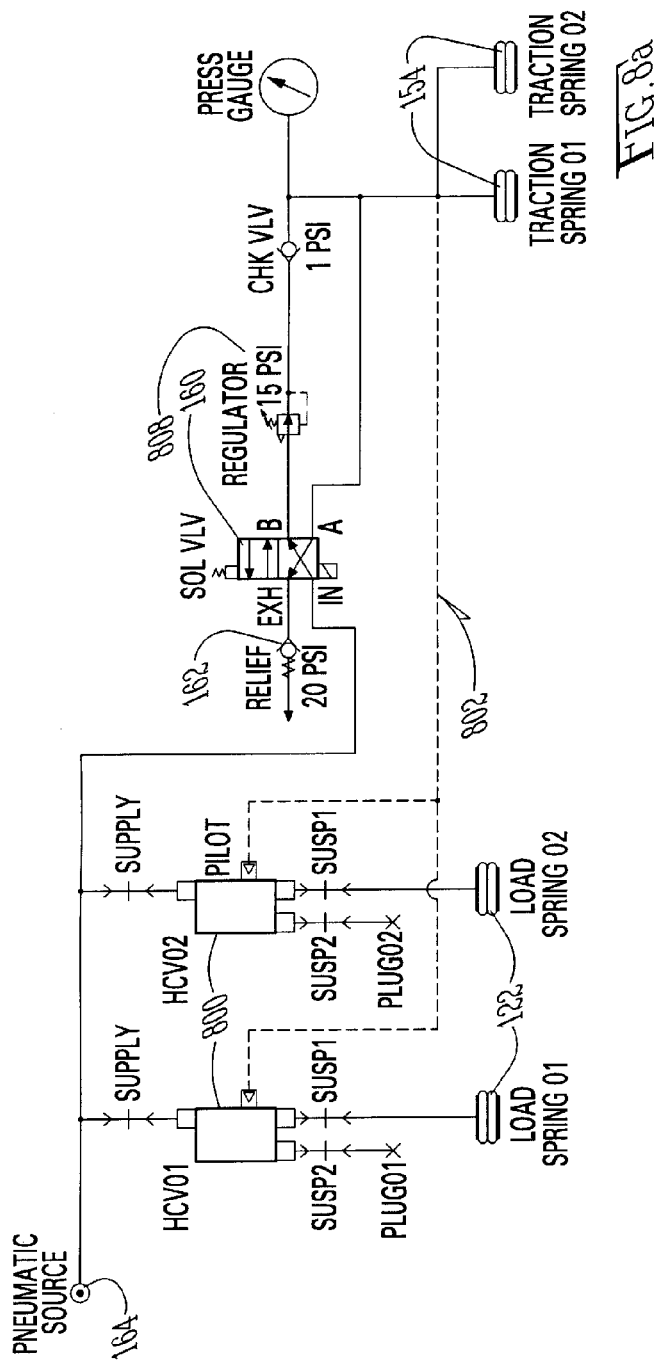
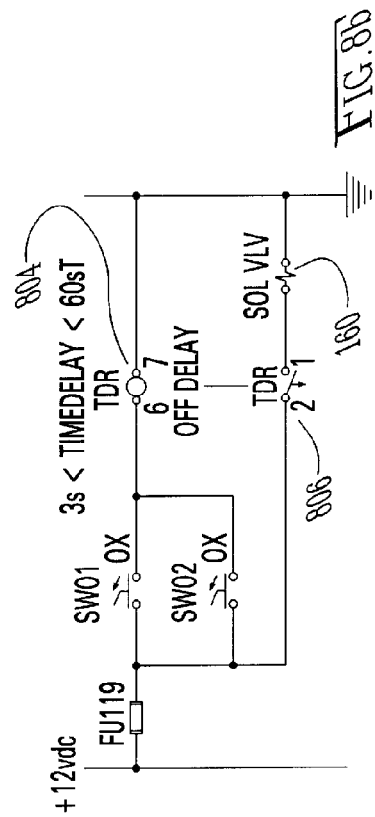
FIG. 8a
FIG. 8b

DATE: 10/4/2012
AUTHOR: JASON DILLARD
SUBJECT: 209 TRACTIVE FORCE
NOTES: Assumed loaded drive tire radius of 20.8"
Assumed vertical CG height of 96" from tire contact patch
Used Cleanscapes weigh tickets to find Xcg as function of W
Static calculations only
Assumed negligible control arm forces

Figure 9

CALCULATION METHOD:
1. Used vehicle FBD to determine front axle total tandem load.
2. Used tandem FBD to determine tag and drive loads based on applied drive torque.
3. Calculated $\Delta Fdx$ = (Ffriction - Fdrive). If negative, wheel slip occurs.
4. Calculated $\Sigma Fx$ = IF(Fdx, applied > Fdx, friction, 0, Fdx, applied - Wx).
5. For $\Sigma Fx < 0$, there is not enough drive force to pull the hill.
6. For $\Sigma Fx = 0$, there is more drive force than available friction. Wheel slip occurs.
7. For $\Sigma Fx > 0$, there is more friction than drive force and enough force to pull hill.
8. $\Delta Fdx$ = Fdx, available - Fdx,applied

STOCK

| | | | Weight | Values | | | | |
|---|---|---|---|---|---|---|---|---|
| | | | 37,940 | | 49,780 | | 62,000 | |
| T (Drive Torque (ft-Lbf)) | φ (Grade Angle (deg)) | μ (coeff static friction) | ΣFx | ΔFdx | ΣFx | ΔFdx | ΣFx | ΔFdx |
| 20,800 | 10.2 | 0.7 | 0 | -5,650 | 0 | -758 | 1,021 | 4,291 |
| | | 0.5 | 0 | -7,464 | 0 | -3,970 | 0 | -364 |
| | | 0.3 | 0 | -9,278 | 0 | -7,182 | 0 | -5,018 |
| | 5 | 0.7 | 0 | -6,037 | 0 | -1,240 | 6,596 | 3,711 |
| | | 0.5 | 0 | -7,741 | 0 | -4,315 | 0 | -778 |
| | | 0.3 | 0 | -9,445 | 0 | -7,389 | 0 | -5,267 |
| | 0 | 0.7 | 0 | -6,475 | 0 | -1,807 | 12,000 | 3,011 |
| | | 0.5 | 0 | -8,054 | 0 | -4,719 | 0 | -1,278 |
| | | 0.3 | 0 | -9,632 | 0 | -7,632 | 0 | -5,567 |
| 15,000 | 10.2 | 0.7 | 0 | -1,614 | -161 | 3,277 | -2,325 | 8,326 |
| | | 0.5 | 0 | -3,626 | 0 | -132 | -2,325 | 3,475 |
| | | 0.3 | 0 | -5,637 | 0 | -3,540 | 0 | -1,377 |
| | 5 | 0.7 | 0 | -2,002 | 4,315 | 2,795 | 3,250 | 7,746 |
| | | 0.5 | 0 | -3,902 | 0 | -476 | 3,250 | 3,060 |
| | | 0.3 | 0 | -5,803 | 0 | -3,747 | 0 | -1,625 |
| | 0 | 0.7 | 0 | -2,440 | 8,654 | 2,228 | 8,654 | 7,047 |
| | | 0.5 | 0 | -4,215 | 0 | -881 | 8,654 | 2,561 |
| | | 0.3 | 0 | -5,991 | 0 | -3,990 | 0 | -1,925 |
| 10,000 | 10.2 | 0.7 | -949 | 1,864 | -3,046 | 6,756 | -5,210 | 11,805 |
| | | 0.5 | 0 | -317 | -3,046 | 3,177 | -5,210 | 6,784 |
| | | 0.3 | 0 | -2,498 | 0 | -401 | -5,210 | 1,763 |
| | 5 | 0.7 | 2,463 | 1,477 | 1,431 | 6,274 | 366 | 11,225 |
| | | 0.5 | 0 | -593 | 1,431 | 2,833 | 366 | 6,369 |
| | | 0.3 | 0 | -2,664 | 0 | -608 | 366 | 1,514 |
| | 0 | 0.7 | 5,769 | 1,039 | 5,769 | 5,707 | 5,769 | 10,525 |
| | | 0.5 | 0 | -906 | 5,769 | 2,428 | 5,769 | 5,870 |
| | | 0.3 | 0 | -2,852 | 0 | -851 | 5,769 | 1,214 |
| 5,000 | 10.2 | 0.7 | -3,834 | 5,343 | -5,931 | 10,235 | -8,095 | 15,284 |
| | | 0.5 | -3,834 | 2,992 | -5,931 | 6,486 | -8,095 | 10,093 |
| | | 0.3 | -3,834 | 642 | -5,931 | 2,738 | -8,095 | 4,902 |
| | 5 | 0.7 | -422 | 4,956 | -1,454 | 9,752 | -2,519 | 14,703 |
| | | 0.5 | -422 | 2,715 | -1,454 | 6,142 | -2,519 | 9,678 |
| | | 0.3 | -422 | 475 | -1,454 | 2,531 | -2,519 | 4,653 |
| | 0 | 0.7 | 2,885 | 4,517 | 2,885 | 9,186 | 2,885 | 14,004 |
| | | 0.5 | 2,885 | 2,403 | 2,885 | 5,737 | 2,885 | 9,179 |
| | | 0.3 | 2,885 | 288 | 2,885 | 2,288 | 2,885 | 4,353 |

DATE: 10/4/2012
AUTHOR: JASON DILLARD
SUBJECT: 209 TRACTIVE FORCE
NOTES: Assumed loaded drive tire radius of 20.8"
Assumed vertical CG height of 96" from tire contact patch
Used Cleanscapes weigh tickets to find Xcg as function of W
Static calculations only
Assumed negligible control arm forces

Figure 10

CALCULATION METHOD:
1. Used vehicle FBD to determine front axle total tandem load.
2. Used tandem FBD to determine tag and drive loads based on applied drive torque.
3. Calculated ΔFdx = (Ffriction - Fdrive). If negative, wheel slip occurs.
4. Calculated ΣFx = IF(Fdx, applied > Fdx, friction, 0, Fdx, applied - Wx).
5. For ΣFx < 0, there is not enough drive force to pull the hill.
6. For ΣFx = 0, there is more drive force than available friction. Wheel slip occurs.
7. For ΣFx > 0, there is more friction than drive force and enough force to pull hill.
8. ΔFdx = Fdx, available - Fdx,applied

STOCK + 4K ADDED TO DRIVE

| | | | Weight | Values | | | | |
|---|---|---|---|---|---|---|---|---|
| | | | 37,940 | | 49,780 | | 62,000 | |
| T (Drive Torque (ft-Lbf)) | φ (Grade Angle (deg)) | μ (coeff static friction) | ΣFx | ΔFdx | ΣFx | ΔFdx | ΣFx | ΔFdx |
| 20,800 | 10.2 | 0.7 | 0 | -2,850 | 3,185 | 2,042 | 1,021 | 7,091 |
| | | 0.5 | 0 | -5,464 | 0 | -1,970 | 1,021 | 1,636 |
| | | 0.3 | 0 | -8,078 | 0 | -5,982 | 0 | -3,818 |
| | 5 | 0.7 | 0 | -3,237 | 7,661 | 1,560 | 6,596 | 6,511 |
| | | 0.5 | 0 | -5,741 | 0 | -2,315 | 6,596 | 1,222 |
| | | 0.3 | 0 | -8,245 | 0 | -6,189 | 0 | -4,067 |
| | 0 | 0.7 | 0 | -3,675 | 12,000 | 993 | 12,000 | 5,811 |
| | | 0.5 | 0 | -6,054 | 0 | -2,719 | 12,000 | 722 |
| | | 0.3 | 0 | -8,432 | 0 | -6,432 | 0 | -4,367 |
| 15,000 | 10.2 | 0.7 | 1,935 | 1,186 | -161 | 6,077 | -2,325 | 11,126 |
| | | 0.5 | 0 | -1,626 | -161 | 1,868 | -2,325 | 5,475 |
| | | 0.3 | 0 | -4,437 | 0 | -2,340 | 0 | -177 |
| | 5 | 0.7 | 5,347 | 798 | 4,315 | 5,595 | 3,250 | 10,546 |
| | | 0.5 | 0 | -1,902 | 4,315 | 1,524 | 3,250 | 5,060 |
| | | 0.3 | 0 | -4,603 | 0 | -2,547 | 0 | -425 |
| | 0 | 0.7 | 8,654 | 360 | 8,654 | 5,028 | 8,654 | 9,847 |
| | | 0.5 | 0 | -2,215 | 8,654 | 1,119 | 8,654 | 4,561 |
| | | 0.3 | 0 | -4,791 | 0 | -2,790 | 0 | -725 |
| 10,000 | 10.2 | 0.7 | -949 | 4,664 | -3,046 | 9,556 | -5,210 | 14,605 |
| | | 0.5 | -949 | 1,683 | -3,046 | 5,177 | -5,210 | 8,784 |
| | | 0.3 | 0 | -1,298 | -3,046 | 799 | -5,210 | 2,963 |
| | 5 | 0.7 | 2,463 | 4,277 | 1,431 | 9,074 | 366 | 14,025 |
| | | 0.5 | 2,463 | 1,407 | 1,431 | 4,833 | 366 | 8,369 |
| | | 0.3 | 0 | -1,464 | 1,431 | 592 | 366 | 2,714 |
| | 0 | 0.7 | 5,769 | 3,839 | 5,769 | 8,507 | 5,769 | 13,325 |
| | | 0.5 | 5,769 | 1,094 | 5,769 | 4,428 | 5,769 | 7,870 |
| | | 0.3 | 0 | -1,652 | 5,769 | 349 | 5,769 | 2,414 |
| 5,000 | 10.2 | 0.7 | -3,834 | 8,143 | -5,931 | 13,035 | -8,095 | 18,084 |
| | | 0.5 | -3,834 | 4,992 | -5,931 | 8,486 | -8,095 | 12,093 |
| | | 0.3 | -3,834 | 1,842 | -5,931 | 3,938 | -8,095 | 6,102 |
| | 5 | 0.7 | -422 | 7,756 | -1,454 | 12,552 | -2,519 | 17,503 |
| | | 0.5 | -422 | 4,715 | -1,454 | 8,142 | -2,519 | 11,678 |
| | | 0.3 | -422 | 1,675 | -1,454 | 3,731 | -2,519 | 5,853 |
| | 0 | 0.7 | 2,885 | 7,317 | 2,885 | 11,986 | 2,885 | 16,804 |
| | | 0.5 | 2,885 | 4,403 | 2,885 | 7,737 | 2,885 | 11,179 |
| | | 0.3 | 2,885 | 1,488 | 2,885 | 3,488 | 2,885 | 5,553 |

Figure 11

| Test | DRIVE WT (Lbf) | TAG WT (Lbf) | DRIVE TRANSFER (Lbf)(TEST X-TEST1) | TRAC ASSIST PRESS (psi) | LOAD PRESS (psi) | TANDEM WT (Lbf) | NOTES |
|---|---|---|---|---|---|---|---|
| 1 | 9,340 | 6,740 | 0 | 0 | HCV | 16,080 | Stock condition. at idle, no brakes, hcv controlling load spring pressure (not measured) |
| 2 | 9,680 | 6,460 | 340 | 12 | HCV | 16,140 | at idle, no brakes, hcv controlling load spring pressure (not measured) |
| 3 | 9,880 | 6,320 | 540 | 22 | HCV | 16,200 | at idle, no brakes, hcv controlling load spring pressure (not measured) |
| 4 | 10,180 | 6,100 | 840 | 32 | HCV | 16,280 | at idle, no brakes, hcv controlling load spring pressure (not measured) |
| 5 | 11,880 | 4,760 | 2,540 | 102 | HCV | 16,640 | at idle, no brakes, hcv controlling load spring pressure (not measured) |
| 6 | 10,860 | 5,480 | 1,520 | 104 | 42 | 16,340 | at idle, no brakes, manual control of load spring pressure |
| 7 | 11,720 | 4,840 | 2,380 | 120 | 22 | 16,560 | at idle, no brakes, manual control of load spring pressure |
| 8 | 12,880 | 4,000 | 3,540 | 122 | 14 | 16,880 | at idle, no brakes, manual control of load spring pressure |
| 9 | 13,340 | 3,660 | 4,000 | 126 | 0 | 17,000 | at idle, no brakes, manual control of load spring pressure |

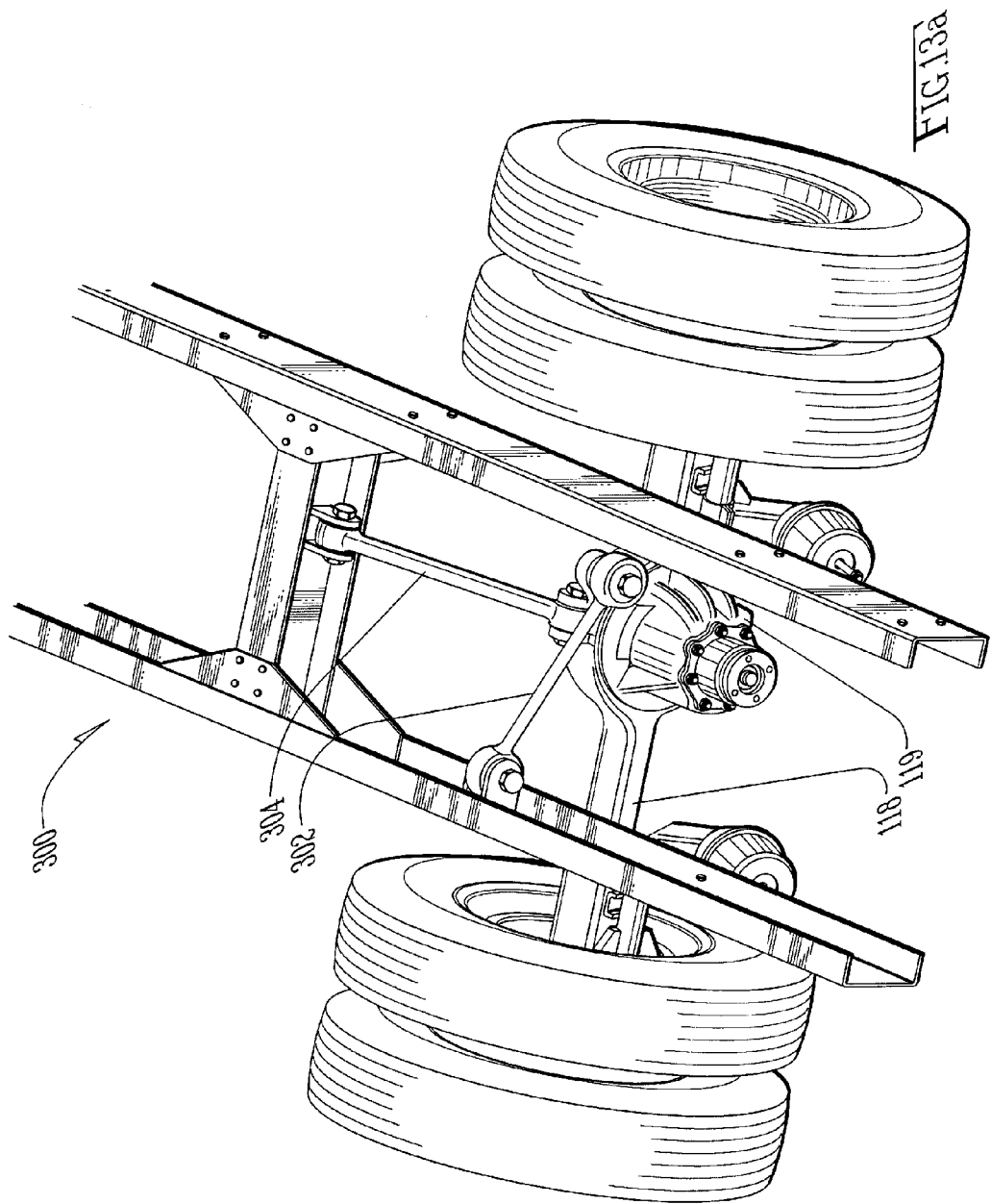

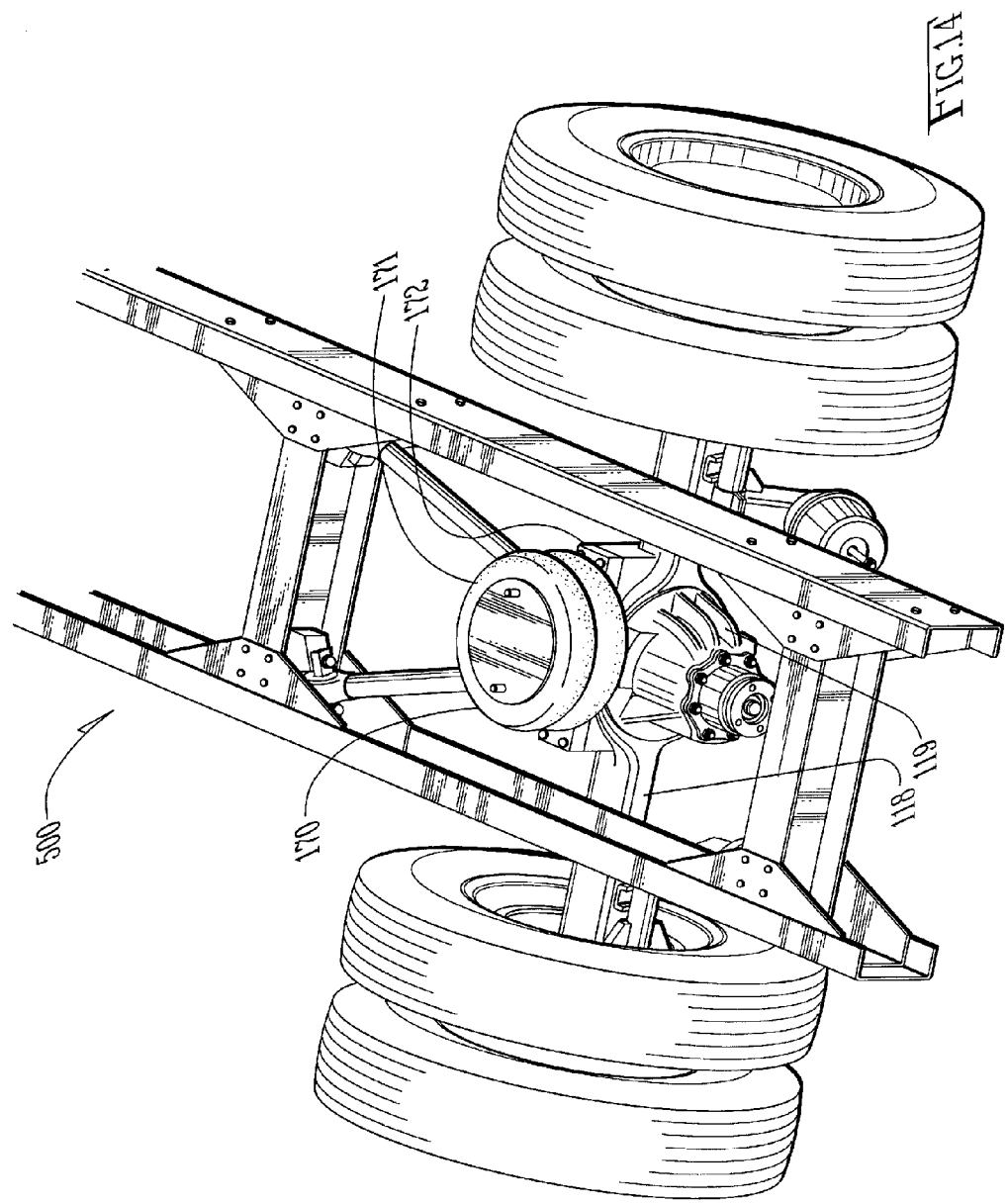

TRACTION CONTROL APPARATUS AND METHOD FOR A TANDEM AXLE SYSTEM

RELATED APPLICATIONS

This application claims the benefit of U.S. patent application Ser. No. 61/737,544 filed Dec. 14, 2012, the disclosure of which is incorporated herein by reference.

BACKGROUND

1. Technical Field

This disclosure relates to suspension systems and, in particular, to suspension systems for trucks having tandem axles including a drive axle and a non-drive axle.

2. Discussion of Related Art

Vehicle suspension systems include a wide variety of configurations and structures. It is common in the large truck industry to provide dual or tandem axle configurations to support heavy loads. Often, a driven or powered axle is used in combination with a non-driven axle. In one configuration, the non-driven axle may be located rearward of the drive axle and is referred to as a "tag" axle. Alternatively, the non-drive axle may be located in front of the drive axle and is referred to as a "pusher" axle. Both tag and pusher non-drive axles can be non-steerable, power steerable or self-steering.

Tandem axle suspensions often include separate hanger brackets or other mounting devices for each of the two axles. It is also commonly known to connect the two axles with a pair of beams, commonly referred to as "suspension beams" or "walking beams," and to pivotally connect the beams to the vehicle chassis with a single hanger bracket mounted to the beams between the two axles.

It has been found that when the single hanger bracket is located at or near the midpoint in the beams between the two axles, an inefficient application of downward force distributed equally to the driven and non-driven axle results. It has been determined that it is desirable and beneficial to place a greater load on the driven axle than on the non-driven axle, particularly in a self-steering tag axle configuration. In one common configuration, each suspension beam or walking beam is pivotally connected to the hanger bracket such that approximately 40% of the overall suspension beam length is located between the hanger pivot and the driven axle, and approximately 60% of the overall suspension beam length is located between the hanger pivot and the non-driven axle. This offset configuration, commonly referred to as a "60/40 tandem axle" or the like, is known to more efficiently distribute the load between the driven axle and the non-driven axle. The benefits of this configuration include improved traction, reduced tire scrub and reduced overall turning radius, when the tag is steerable.

In some cases, even with the 60/40 tandem axle distribution, traction control can be difficult. For example, in certain heavy trucks with non-drive tag axles, such as, for example, refuse trucks, it can be difficult to maintain traction. Specifically, when these trucks are empty, there may be insufficient downward force on the drive axle to ensure traction in unfavorable road conditions such as extreme grades with or without weather conditions such as rain, snow and the like.

SUMMARY

According to one aspect, a traction assist system for a vehicle having a tandem-axle system is provided. The tandem-axle system includes a drive axle and a non-drive axle attached to a suspension beam on opposite sides of a pivot about which the suspension beam is rotatable. A device selectively applies a force to the suspension beam on the side of the pivot at which the drive axle is attached, such that the suspension beam tends to rotate to provide a downward force on the drive axle.

According to another aspect, a traction assist system for a vehicle having a tandem-axle system is provided. The tandem-axle system includes a drive axle and a non-drive axle attached to a suspension beam on opposite sides of a pivot about which the suspension beam is rotatable. The traction assist system comprises a device coupled to the suspension beam to create a rotational moment along the suspension beam on the side of the pivot at which the drive axle is attached to the suspension beam.

According to another aspect, a traction assist system for a vehicle having a tandem-axle system is provided. The tandem-axle system includes a drive axle and a non-drive axle, the traction assist system comprising a traction-assist device for selectively applying a downward force on the drive axle.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the preferred embodiments. In the drawings, the sizes and thicknesses of layers, regions and features may be exaggerated for clarity.

FIG. 4A includes a schematic side view of another embodiment of the tandem-axle suspension system of the type to which the present disclosure is applicable.

FIG. 4B includes a schematic perspective view of the embodiment of the tandem-axle suspension system illustrated in FIG. 4A.

FIG. 5A includes a schematic perspective view of a load transfer device assembly used to apply the additional downward force on a drive axle, in accordance with some exemplary embodiments.

FIG. 5B includes a schematic side view of the load transfer device assembly illustrated in FIG. 5A.

FIG. 7A includes perspective view of the second bracket of the load transfer device illustrated in FIGS. 5A and 5B, according to some exemplary embodiments.

FIG. 7B includes a schematic side view of the second bracket of the load transfer device illustrated in FIGS. 5A and 5B, according to some exemplary embodiments.

FIG. 7C includes a schematic bottom view of the second bracket of the load transfer device illustrated in FIGS. 5A and 5B, according to some exemplary embodiments.

FIG. 8A includes a schematic diagram of the pneumatic control system for an embodiment of the tandem-axle suspension system.

FIG. 8B includes a schematic diagram of the electrical control system for an embodiment of the tandem-axle suspension system.

FIG. 9 depicts a chart including data illustrating the effect of the traction assist system of the disclosure on vehicle traction under various conditions at various drive axle inputs, according to some exemplary embodiments.

FIG. 10 depicts a chart including data illustrating the effect of the traction assist system of the disclosure on vehicle traction under various at various drive axle inputs, according to some exemplary embodiments.

FIG. 11 includes a chart including data illustrating downward force of the drive axle of 4,000 pounds with a reduction in the tag axle weight of over 3,000 pounds, according to some exemplary embodiments.

FIGS. 13A and 13B include images of portions of two tandem-axle vehicle suspension systems, according to some exemplary embodiments.

FIG. 14 includes an image of a portion of a tandem-axle vehicle suspension system, according to some exemplary embodiments.

DETAILED DESCRIPTION

Figure 1:
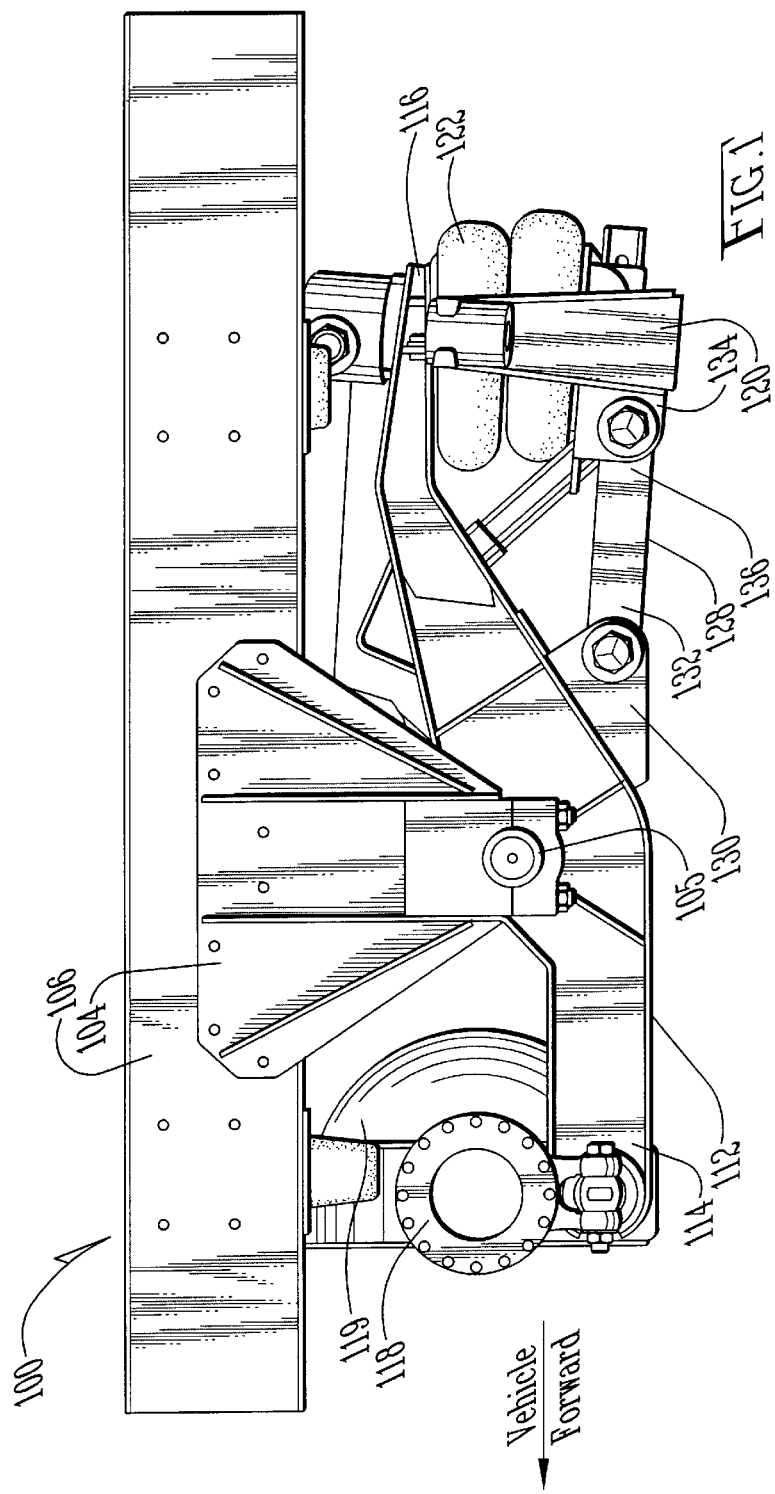
FIG. 1 includes a schematic side view of an embodiment of the tandem-axle suspension system of the type to which the present disclosure is applicable.
Figure 2:
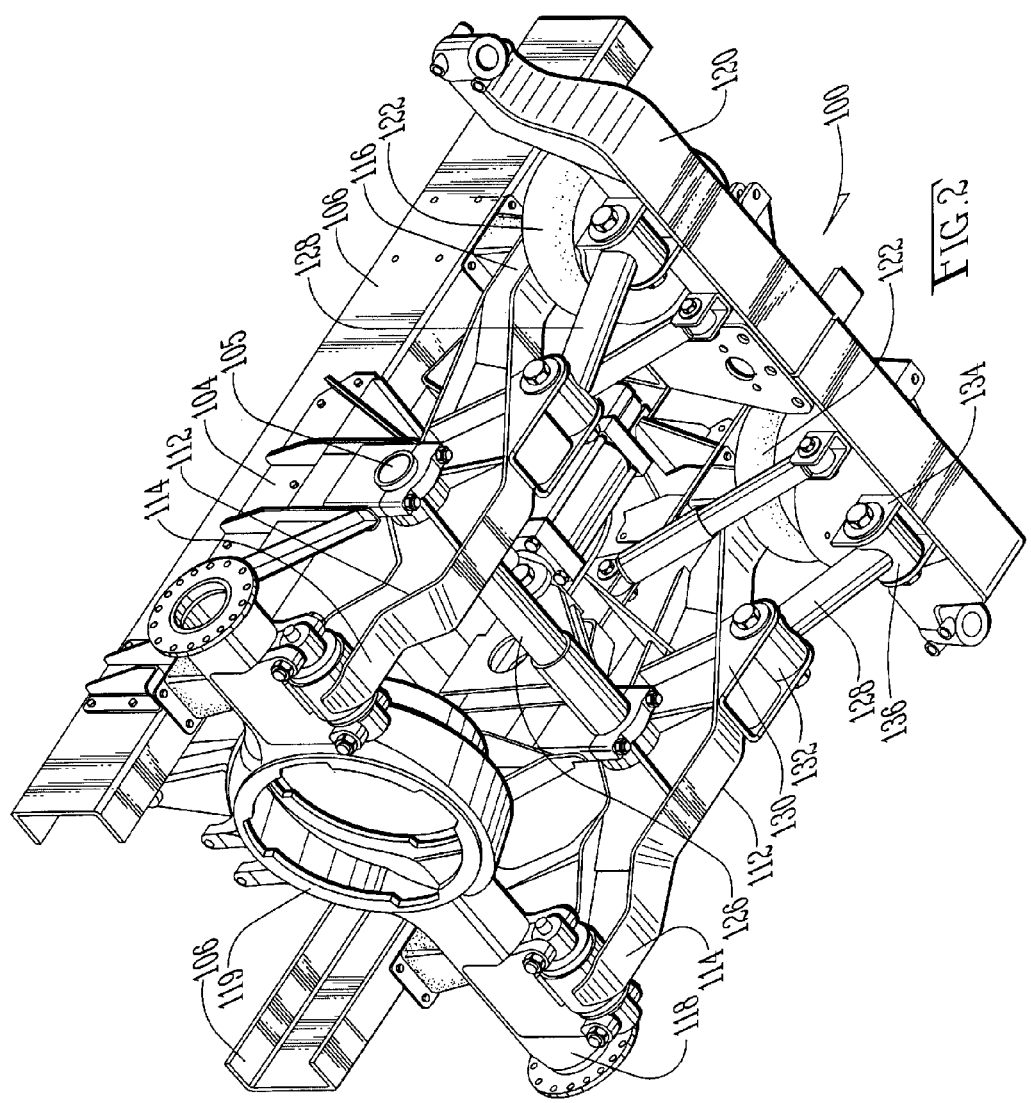
FIG. 2 includes a schematic perspective view of the embodiment of the tandem-axle suspension system illustrated in FIG. 1.
Figure 3:
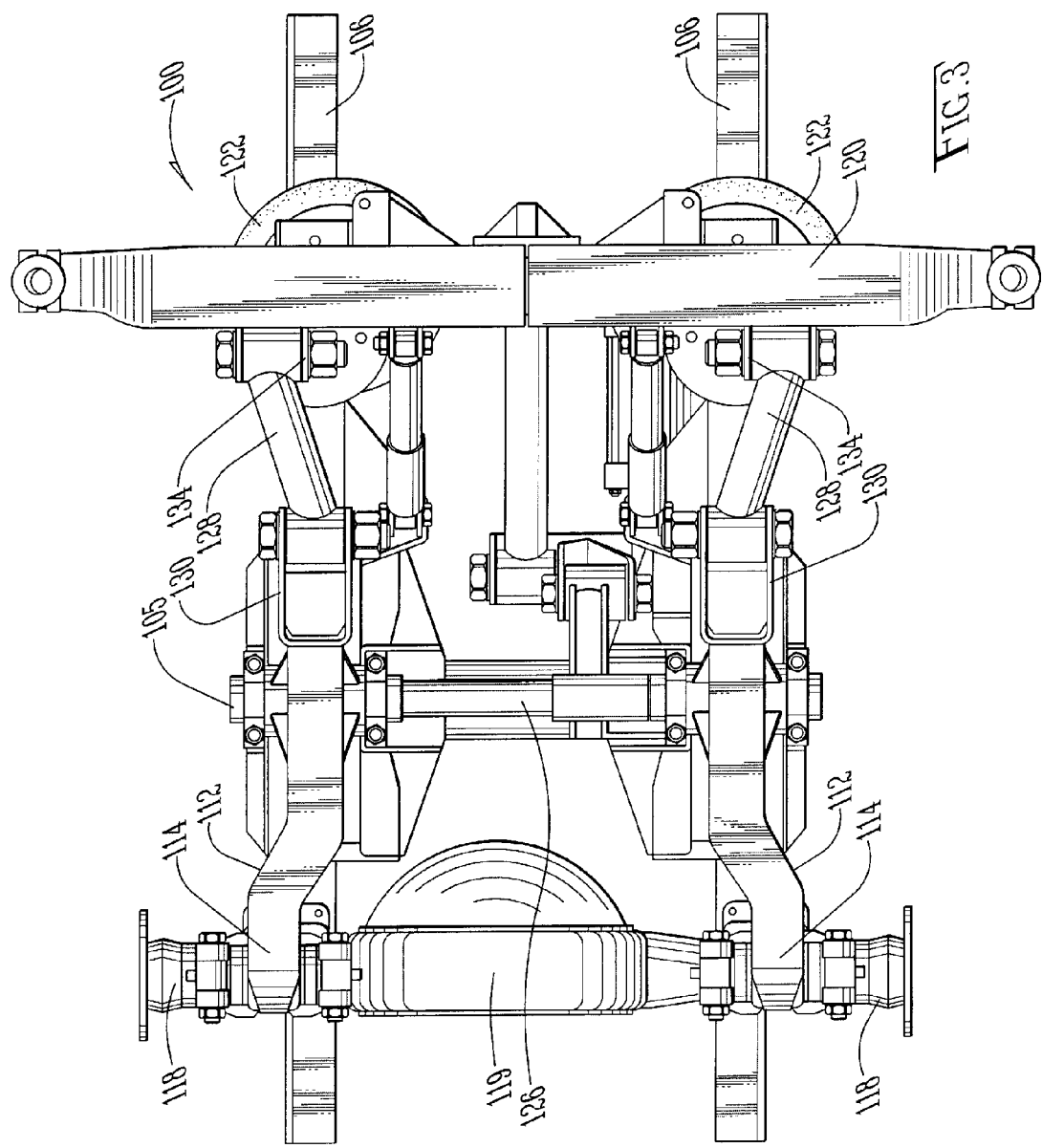
FIG. 3 includes a schematic bottom view of the embodiment of the tandem-axle suspension system illustrated in FIGS. 1 and 2.

FIG. 1 includes a schematic side view of an embodiment of the tandem-axle suspension system of the type to which the present disclosure is applicable. FIG. 2 includes a schematic perspective view of an embodiment of the tandem-axle suspension system illustrated in FIG. 1. FIG. 3 includes a schematic bottom view of an embodiment of the tandem-axle suspension system illustrated in FIGS. 1 and 2.

Referring to FIGS. 1-3, a tandem-axle vehicle suspension 100 is illustrated. It is understood that the suspension system includes two identical assemblies, one positioned on either side of the vehicle. For simplicity, FIG. 1 illustrates only one of the assemblies. Referring to FIG. 1, the suspension system 100 includes a pair of suspension hanger brackets 104 fixedly and immovably attached to vehicle chassis 106. A suspension beam 112 is pivotally coupled to hanger bracket 104 at a pivot 105. Each suspension beam 112 has a forward or first end 114 and a rearward or second end 116. In one configuration of tandem axle vehicle suspension system 100, the forward end 114 of each suspension beam 112 is attached to a drive axle 118, as shown. The rearward end 116 of each suspension beam 112 is oriented generally above or over a non-driven axle 120, with a resilient air spring or pneumatic spring 122 positioned between the suspension beam 112 and the upper-most axle surface. A bell housing 119 is located midway along the length of drive axle 118.

The overall geometry of each suspension beam 112 is that of an offset lever wherein the forward end is oriented generally downward away from the vehicle chassis 106 such that the drive axle 118 can be positioned between the suspension beam 112 and the vehicle chassis 106. The rearward end 116 of each suspension beam 112 is canted generally upward in orientation from the forward end 114 such that it overlies the non-driven axle 120.

The dimension or length A between pivot 105 of the suspension hanger bracket 104 and the driven axle 118 attached near the first end 114 of the suspension beam 112 is less than 50% and is approximately 40% of the overall suspension beam length. The dimension or length B between the pivot 105 and the non-drive axle 120 attached near the second end 116 of the suspension beam 112 is greater than 50% and is approximately 60% of the overall suspension beam length. This orientation imparts approximately 60% of the downward load on the drive axle 118 and 40% of the downward load on the non-driven axle 120.

In FIG. 1, the directional arrow represents the front of the vehicle assuming a forward moving direction. Accordingly, the driven axle 118 is positioned forward of the non-driven axle 120, which is commonly referred to as a "tag" axle. It is to be understood that, in accordance with the present disclosure, the relative positions of the driven axle 118 and the non-driven axle 120 with respect to the forward direction can be reversed. That is, the driven axle 118 can be located rearward of the non-driven axle 120, which, in that configuration, would then be referred to as a "pusher" axle. In this configuration, the geometry of the suspension beams 112 remains the same, with approximately 40% of the overall beam length being between the pivot 105 and the driven axle 118 and approximately 60% of the overall beam length being between the non-driven axle 120 and the pivot 105.

A torque rod 128 can be pivotally mounted between the non-driven axle 120 and the suspension beam 112, below the pivot 105. A first bracket 130 may be mounted to a lower face of the suspension beam 112 substantially near the hanger bracket 104 for mounting a first end 132 of the torque rod 128. A second bracket 134 can be mounted to a face of the non-driven axle 120 to receive and pivotally retain the second end 136 of the torque rod 128. A stiffening rod 126 can be positioned between suspension beams 112 to reduce or limit side loading.

A pivot bushing can be mounted at both the first end 132 and the second end 136 of the torque rod 128 within the first and second mounting brackets 130, 134, respectively. The torque rod ends 132, 136 may generally be retained within the mounting brackets 130, 134 by a nut and bolt fastener, or similar fastening mechanism.

In this configuration, the vertical load imparted by the vehicle is unequally applied between the driven axle 118 and non-driven axle 120 because of the offset configuration of suspension beams 112 within hanger brackets 104. The suspension beam 112 geometry accommodates the 60/40 offset mounting configuration with one resilient air bag 122 per suspension beam 112, which effectively cushions both the driven and non-driven axles 118, 120.

Figure 4C:
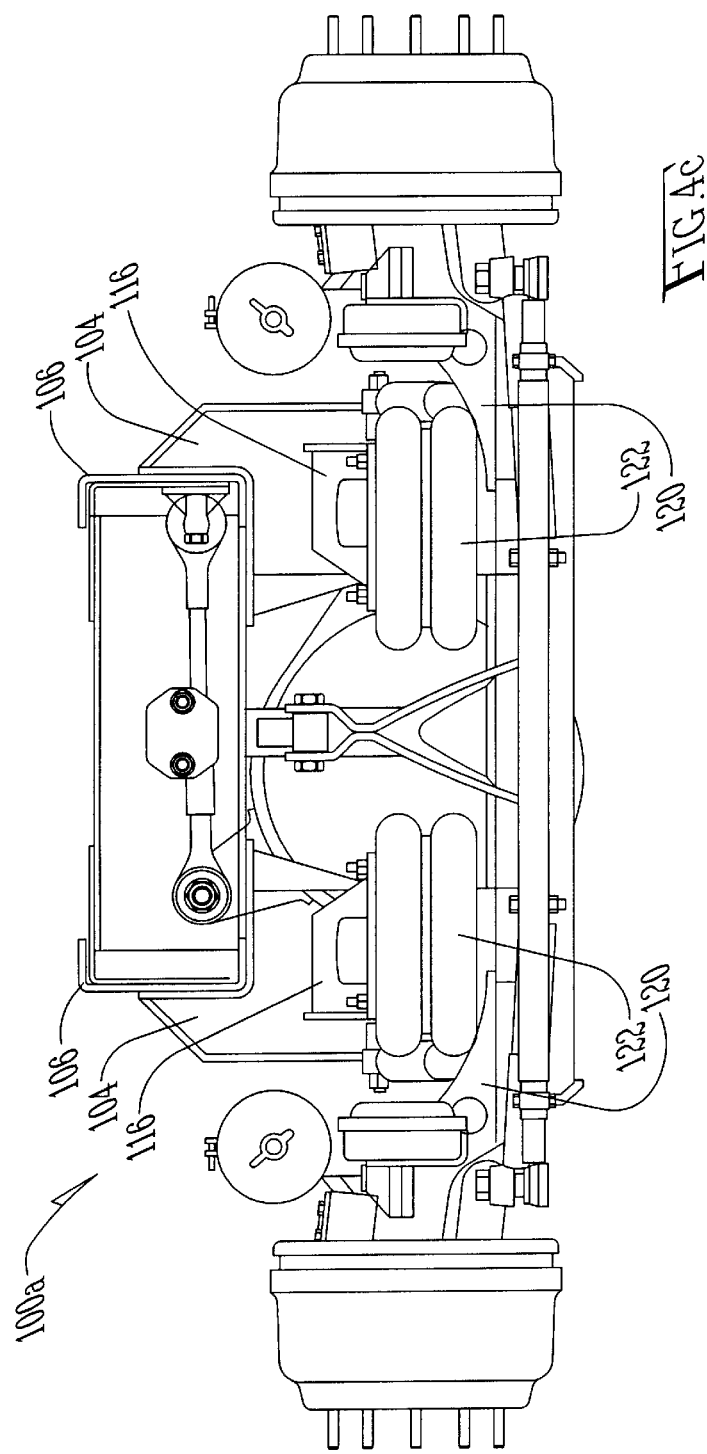
FIG. 4C includes a schematic bottom view of the embodiment of the tandem-axle suspension system illustrated in FIGS. 4A and 4B.
Figure 6A:
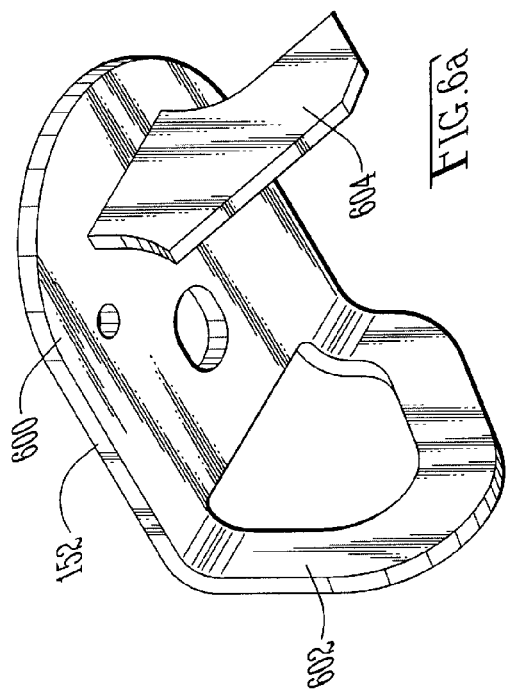
FIG. 6A includes a perspective view of the first bracket of the load transfer device illustrated in FIGS. 5A and 5B, according to some exemplary embodiments.
Figure 6D:
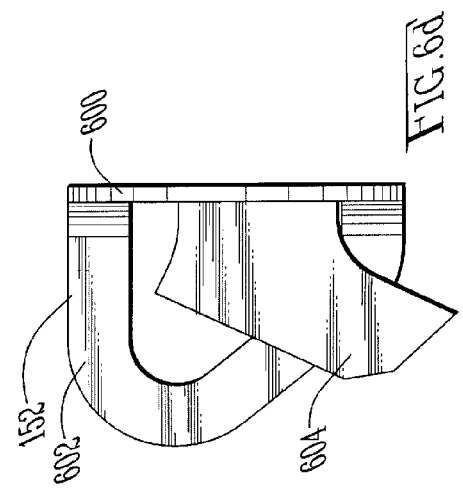
FIG. 6D includes a schematic side view of the first bracket of the load transfer device illustrated in FIGS. 5A and 5B, according to some exemplary embodiments.
Figure 6B:
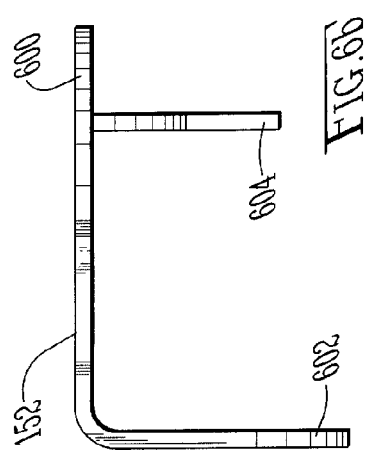
FIG. 6B includes a schematic side view of the first bracket of the load transfer device illustrated in FIGS. 5A and 5B, according to some exemplary embodiments.
Figure 6C:
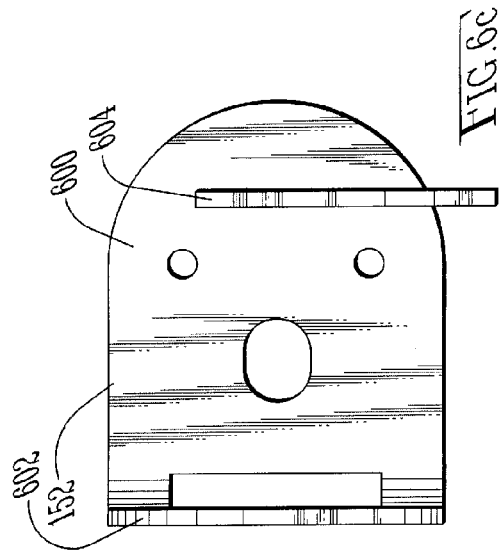
FIG. 6C includes a schematic bottom view of the first bracket of the load transfer device illustrated in FIGS. 5A and 5B, according to some exemplary embodiments.

FIG. 4 includes several views of another tandem-axle suspension system 100a of the type to which the present disclosure is applicable. FIG. 4a is a side view of the suspension system 100a. FIG. 4b is a top view of suspension system 100a. FIG. 4c is a rear view of suspension system 100a. System 100a is similar to system 100 described above in connection with FIGS. 1-3, and the foregoing detailed description in connection with FIGS. 1-3 is applicable to FIGS. 4a, 4b, and 4c as well. Detailed description of like elements in the systems 100 and 100a will not be repeated.

Referring to FIGS. 4a, 4b, and 4c, tandem-axle suspension system 100a includes a pair of suspension hanger brackets 104 fixedly and immovably attached to vehicle chassis 106. Suspension beam 112 is pivotally coupled to hanger bracket 104 at a pivot 105. Each suspension beam 112 has a forward or first end 114 and a rearward or second end 116. In one configuration of tandem-axle suspension system 100a, forward end 114 of each suspension beam 112 is attached to a drive axle 118, as shown. The rearward end 116 of each suspension beam 112 is oriented generally above or over a non-driven axle 120, with resilient air spring 122 positioned between the suspension beam 112 and the uppermost axle surface.

As noted previously, even with the 60/40 tandem-axle distribution of the systems 100 and 100a described above, traction can be reduced or lost altogether under certain circumstances. For example, in certain heavy trucks with a non-drive tag axle, such as, for example, refuse trucks, it can be difficult to maintain traction. Specifically, when these trucks are empty, there may be insufficient downward force on the drive axle to ensure traction in unfavorable road conditions such as extreme grades with or without weather conditions such as rain, snow and the like.

According to the present disclosure, this problem is solved by providing for the selective application of additional downward force on drive axle 118 to increase friction between the drive tires and the road surface. In some exemplary embodiments, this is accomplished by applying additional downward force on suspension beams 112 to the drive axle side of pivot 105. This additional downward force causes suspension beams 112 to tend to rotate about pivot 105 such that the additional downward force is applied to drive axle 118. This application of downward force to suspension beams 112 can be accomplished by any of various devices and/or subsystems, including, but not limited to, an air bellows assembly in addition to the resilient air spring 122 at tag axle 120. In other embodiments, devices and/or subsystems such as a hydraulic shaft, mechanical spring or other mechanism can be used.

FIGS. 5A and 5B include detailed views of a load transfer device/assembly 150 used to apply the additional downward force on drive axle 118, in accordance with some exemplary embodiments. Referring specifically to FIG. 5A, load transfer device 150 includes a first bracket, or upper spring base, 152, which is fixedly attached to an arm of suspension hanger bracket 104, such as by welding. Load transfer device 150 also includes a second bracket 156 fixedly attached to suspension beam 112 on the drive-axle-side of pivot 105 on suspension beam 112, as shown, such as by welding. Load transfer device 150 further includes an air bellows or air spring 154 disposed and captured between first and second brackets 152, 156, respectively, as shown. FIG. 5B depicts the brackets 152 and 156 attached to bracket 104 and suspension beam 112, respectively.

Load transfer device assembly 150 operates by selectively inflating air spring 154 when additional traction at drive axle 118 is required. When the bag or bladder of air spring 154 inflates, a force is applied between first and second brackets 152, 156. The force causes suspension beam 112 to tend to rotate about pivot 105 such that additional downward force is applied to drive axle 118, resulting in improved traction. In some embodiments, air spring 122 at tag axle 120 is also deflated to permit rotation of suspension beam 112. In this embodiment, the pressure control valve on the tag air suspension is replaced with a valve having a dump feature. This allows the air to be exhausted from the tag axle suspension bag almost immediately, such that the traction control bag in traction control air spring 154 can be inflated quickly and generate the desired downward force on drive axle 118. In some exemplary embodiments, this system creates up to four thousand pounds of downward force on drive axle 118.

FIGS. 6A, 6B, 6C and 6D include multiple detailed views of first bracket, or upper spring base, 152, according to some exemplary embodiments. The first bracket 152 is fixed to hanger bracket 104 and may also be fixed to chassis 106 in some embodiments. The first bracket 152 comprises face plate 600 for engaging the air spring 154. Tab 602 extends perpendicularly to face plate 600 for attaching to hanger bracket 104 by welding or other suitable means of attachment. Gusset 604 extends perpendicularly to face plate 600 at a separation from tab 602 to provide additional points of attachment via welding or other means to the opposite side of hanger bracket 104. The specific shape of the bracket and its components is not intended to be limiting as the shape of the various components may be modified as necessary to affix the bracket 152 to other geometries of hanger bracket 104 and chassis 106.

FIGS. 7A, 7B and 7C include multiple detailed views of second bracket 156, according to some exemplary embodiments. The second bracket, or lower spring base, 156 is fixed to suspension beam 112 by welding or other appropriate attachment. The second bracket 156 comprises a face plate 700 for engaging the air spring 154. Outside gusset 702 is welded to and extends approximately perpendicular from the back side of face plate 700. Inside gusset 704 extends from the back side of face plate 700 at a separation from gusset 702 to provide additional points of attachment via welding or other means. The specific shape of the bracket and its components is not intended to be limiting as the shape of the various components may be modified as necessary to affix the bracket 156 to other geometries of suspension beam 112.

In operation, the load transfer device can be operated manually by a user, such as the driver of the vehicle. When the driver notices drive wheel slip, he/she can flip a toggle or momentary switch which activates the traction assist system. FIGS. 8A and 8B includes schematic diagrams which illustrate the pneumatic and electrical control systems used in the operation of the traction assist system, according to some exemplary embodiments.

Referring to FIG. 8A, tag air springs 122 and traction assists air springs 154 receive pressurized air from pneumatic source 164. When the traction assist system is deactivated during normal system operation, tag load springs 122 are maintained at the system pressure. Traction springs 154 receive a nominal pressure, typically 15 p.s.i., during deactivation which flows through valve 160 and through pressure regulator 808. When pneumatic valve 160 is energized, springs 154 are inflated with pressurized air from source 164, and tag load springs 122 are dumped, i.e., deflated. The deflation of tag load springs 122 is provided by the pilot valves 800 which open when the pressure of springs 154, which is fed to pilot valves 800 by pilot line 802, exceeds a threshold. When traction assist is no longer needed or desired, pneumatic valve 160 is deactivated, air in traction springs 154 is dumped through pneumatic valve 160 via relief 162 to a nominal pressure between 15 and 20 p.s.i, and tag load springs 122 are inflated as the pressure in pilot line 802 drops below the threshold and the pilot valves 800 are deactivated.

In some exemplary embodiments, the system includes a timer depicted in FIG. 8B, which is adjustable to limit the amount of time that the traction bags, i.e., traction springs 154, are pressurized. In some exemplary embodiments, that time is set to approximately 60 seconds. This is sufficient since, in some exemplary embodiments, the traction assist system is used only at creep speeds, and not at high speeds. By limiting the duration of the traction assist pressure, the system allows the vehicle to regain traction at low speeds, and then the system is automatically deactivated. For example, deactivation can occur at the expiration of a selected period of time or upon the vehicle achieving a predetermined speed. Traction is typically not an issue at higher vehicle speeds.

In the depicted embodiment, the timer comprises a time delay relay 804 that, when activated by a user pressing the momentary switch, holds switch 806 closed for a predetermined amount of time, but typically between 3 and 60 seconds. When switch 806 is closed, solenoid 160 is activated.

In some embodiments, due to a desire to isolate the traction assist system from the environment, the pneumatic system is closed to outside air. This is particularly useful in high-humidity environments where moisture in the air can create undo wear on system components, can interfere with performance of certain valves and can cause undesirable time delays due to sluggish operation.

FIGS. 9 and 10 include two charts including data illustrating the effect of the traction assist system of the disclosure on vehicle traction under various loads at various drive axle torque of a vehicle, according to some exemplary embodiments. Specifically, FIG. 9 shows the data for a stock vehicle, without the traction assist of the disclosure, and FIG. 10 shows the data for a vehicle using the traction assist of the disclosure, with four thousand pounds of additional downward force applied to the drive axle. In the data provided in FIGS. 9 and 10, calculations are provided vehicles with four different amounts of drive torque ranging from 5,000 ft-lbs to 20,800 ft-lbs on slopes ranging from 0 degrees to 10.2 degrees and for coefficients of friction ranging from 0.3 to 0.7, and for truck load weight values from 37,940 lbs to 62,000 lbs. When the $\Sigma Fx=0$ the drive torque is insufficient to pull the load up the slope. If $\Sigma Fx>0$ the drive force is sufficient to pull the load up the slope and the friction is sufficient to prevent wheel slippage. If $\Sigma Fx<0$ the drive force is sufficient but exceeds the available friction and the wheels slip. As can be seen by comparing the data in FIGS. 9A and 10, the application of 4,000 lbs of pressure with the disclosed invention increases the range of conditions in which a given drive torque is capable of pulling a given load up a wider range of slopes.

FIG. 11 includes a chart including data illustrating downward force of the drive axle with various pressures in the traction assist air spring. In Test 1, the pressure on the drive axle (DRIVE WT) and on the tag axle (TAG WT) of a stock vehicle with no traction assist are provided. As the traction assist pressure is increased from test 2 through test 9 the DRIVE WT increases by a maximum 4,000 pounds (Test 9) with a corresponding reduction in the tag axle weight of over 3,000 pounds, according to an exemplary embodiment. The various tests depict the effect of increasing pressure in the traction assist air spring on the weights of the various axles.

In the various exemplary embodiments described above, additional downward traction-assist force is applied to drive axle 118 by applying a rotational force (torque) to the moment arm formed by the portion of the suspension arm 112 between pivot 105 and drive axle 118. According to other exemplary embodiments, the additional downward traction-assist force can be applied directly to drive axle 118. In some exemplary embodiments, this can be accomplished by a controllable air spring or pneumatic spring of the type of air spring or pneumatic spring 122, 154 described above in connection with the previously described exemplary embodiments.

Figure 12:
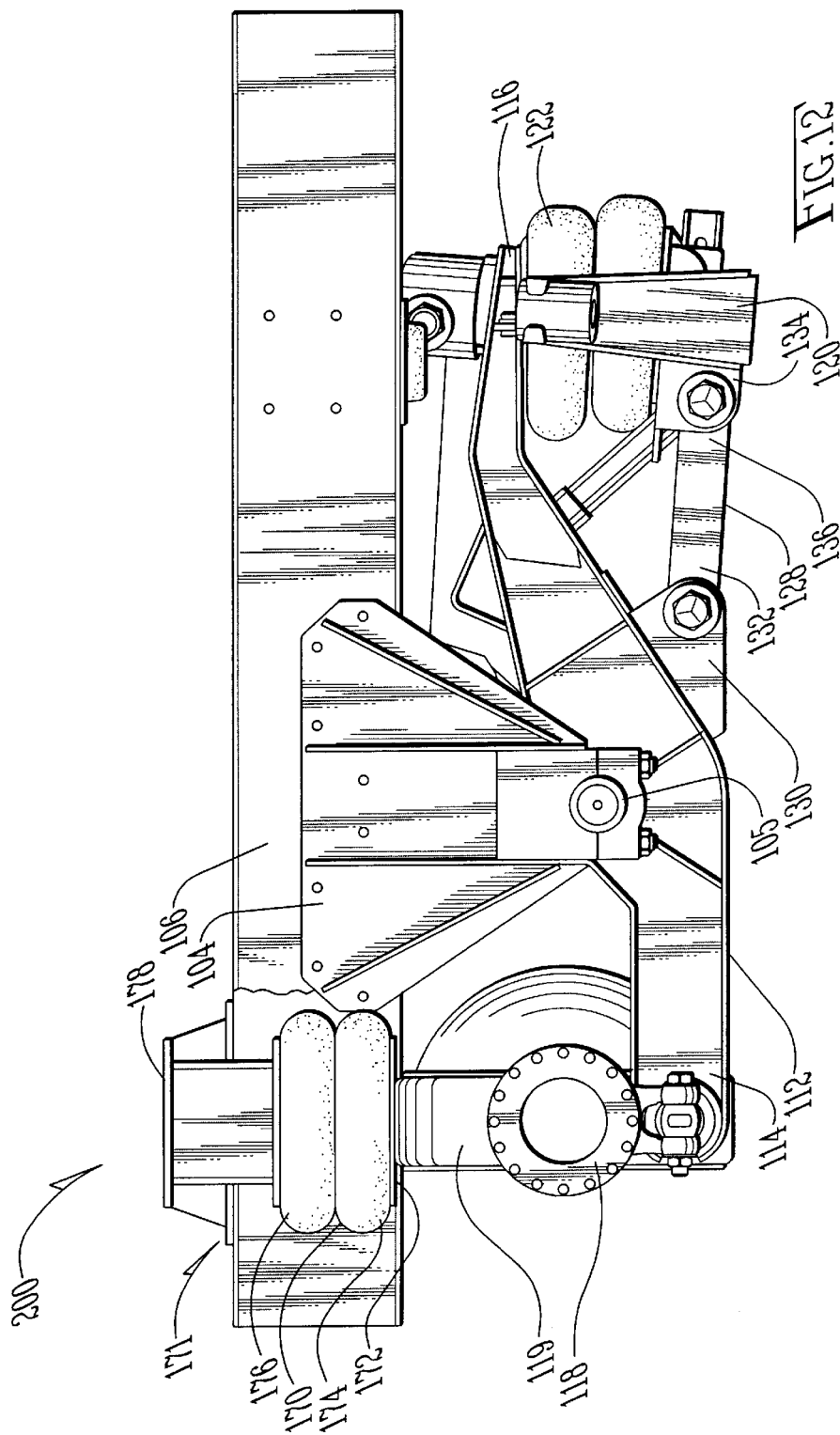
FIG. 12 includes a schematic side view of a tandem-axle suspension system having a traction assist system, according to some exemplary embodiments.

FIG. 12 includes a schematic side view of a general tandem-axle suspension system 200 having a traction assist system 171, according to some exemplary embodiments. Referring to FIG. 12, some of the illustrated elements are the same as elements illustrated and described above in detail with respect to FIGS. 1-5. These like elements are identified by like reference numerals. Detailed description of these like elements will not be repeated.

Referring to FIG. 12, as described above, in the illustrated embodiment, additional downward traction-assist force is controllably applied directly to drive axle 118 via an air spring or pneumatic spring 170 of traction-assist system 171. Pneumatic spring 170 is mounted between bell housing 119 and the vehicle frame or chassis. A bottom end 174 of pneumatic spring 170 is mechanically coupled/connected to drive axle 118 via a bracket 172. A top end 176 of pneumatic spring 170 is mechanically coupled/connected to a frame bracket 178, which is mounted to the vehicle chassis or frame stationary with respect to the vehicle chassis or frame. Pneumatic spring 170, disposed between drive axle 118 and vehicle frame bracket 174, is controllably inflated, in the same manner as springs 154 in the previously described embodiment, to apply the additional downward traction-assist force to axle 118 and deflated to remove the additional traction-assist force. In some exemplary embodiments, the control and timing of the inflation/deflation of the bag of pneumatic spring 170, as well as the configuration of the pneumatic system for this embodiment of the traction-assist system, are in accordance with the control, timing and configuration of the embodiments of the traction assist system of the disclosure described above in detail and illustrated in FIG. 8.

Continuing to refer to FIG. 12, in some exemplary embodiments, pneumatic spring 174 can use a relatively larger bag because of the increased clearance over bell housing 119. As a result, a much larger downward traction-assist force can be applied to drive axle 118. In some particular exemplary embodiments, the applied force is in the range of 8,000 to 12,000 pounds.

Figure 13B:
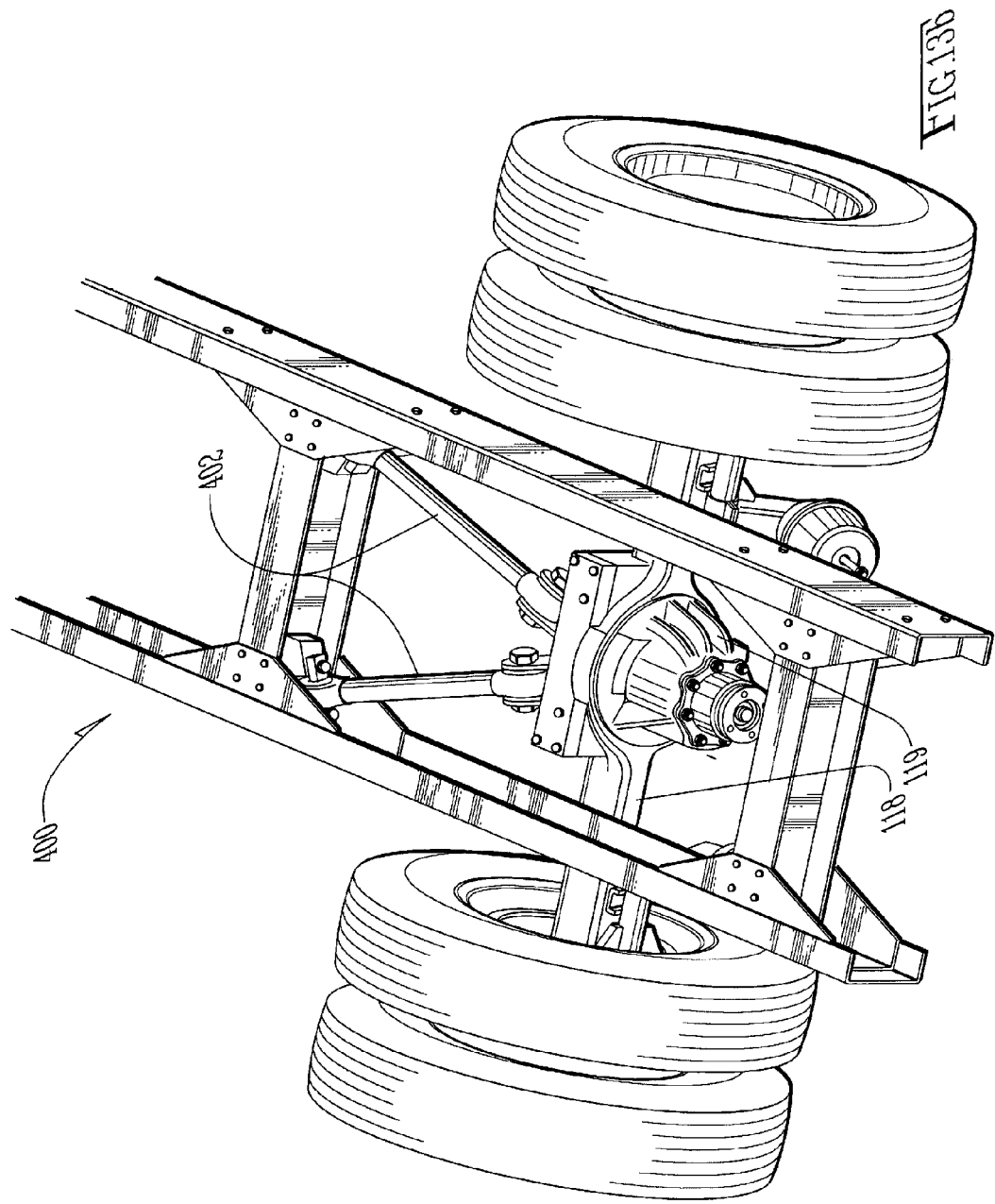

FIGS. 13A and 13B include images of portions of two tandem-axle vehicle suspension systems, according to some exemplary embodiments. It is noted that the images of FIGS. 13A and 13B illustrate only drive axles 118. It will be understood that the illustrated embodiments also include non-drive axles 120, suspension beams 112, and a traction assist system, as described above in detail.

Referring to FIG. 13A, vehicle suspension system 300 includes drive axle rods 302 and 304 to provide stability to the vehicle. Referring to FIG. 13B, in the vehicle suspension system 400, drive axle rods are replaced with a V-link structure 402, which creates improved stability.

FIG. 14 includes an image of a portion of a tandem-axle vehicle suspension system 500, according to some exemplary embodiments. It is noted that the image of FIG. 14 illustrates only drive axle 118. It will be understood that the illustrated embodiment also include non-drive axle 120 and suspension beam 112, as described above in detail.

Referring to FIG. 14, suspension system 500 includes V-link stability structure 402 illustrated in FIG. 13B. Suspension system 500 also includes traction-assist system 171 described in detail above in connection with FIG. 12. Traction-assist system 171 includes pneumatic spring 170, which is mounted over bell housing 119 and which is mechanically coupled/connected to drive axle 118 by bracket 172.

While the present disclosure has shown and described exemplary embodiments, it will be understood by those of ordinary skill in the art that various changes in form and details may be made therein without departing from the spirit and scope of the present disclosure, as defined by the following claims.

We claim:

1. A traction assist system for a vehicle having a tandem-axle system, the tandem-axle system including a drive axle and a non-drive axle attached to a suspension beam on opposite sides of a pivot about which the suspension beam is rotatable and a suspension pneumatic spring disposed between the non-drive axle and the vehicle, the traction assist system comprising:

a device for selectively applying a force to the suspension beam on the side of the pivot at which the drive axle is attached, such that the suspension beam tends to rotate to provide a downward force on the drive axle.

2. The system of claim 1, wherein the device comprises a pneumatic spring.

3. The system of claim 2, wherein the device comprises a pneumatic valve controllable by a user to selectively provide air to the pneumatic spring to inflate the pneumatic spring.

4. The system of claim 3, wherein the pneumatic valve also selectively releases air from the suspension pneumatic spring.

5. The system of claim 2, further comprising a timer for controlling an amount of time during which the pneumatic spring is inflated.

6. The system of claim 2, wherein the pneumatic spring is disposed between a bell housing of the drive axle and the vehicle.

7. The system of claim 2, wherein the device further comprises a first bracket attached to the vehicle, a second bracket attached to the suspension beam between the pivot and the drive axle, wherein the pneumatic spring is disposed between the first bracket and the second bracket.

8. The system of claim 1, wherein the downward force on the drive axle is approximately 4,000 pounds.

9. A traction assist system for a vehicle having a tandem-axle system including a drive axle and a non-drive axle attached to a suspension beam on opposite sides of a pivot about which the suspension beam is rotatable and a suspension pneumatic spring disposed between the non-drive axle and the vehicle, the traction assist system comprising:

a device coupled to the suspension beam on the side of the pivot at which the drive axle is attached to the suspension beam to create a rotational moment along the suspension beam to provide a downward force on the drive axle.

10. The system of claim 9, wherein the device comprises a pneumatic spring.

11. The system of claim 10, wherein the device comprises a pneumatic valve controllable by a user to selectively provide air to the pneumatic spring to inflate the pneumatic spring.

12. The system of claim 11, wherein the pneumatic valve also selectively releases air from the suspension pneumatic spring coupled to the non-drive axle.

13. The system of claim 10, further comprising a timer for controlling an amount of time during which the pneumatic spring is inflated.

14. The system of claim 10, wherein the pneumatic spring is disposed between a bell housing of the drive axle and the vehicle.

15. The system of claim 10, wherein the device further comprises a first bracket attached to the vehicle, a second bracket attached to the suspension beam between the pivot and the drive axle, wherein the pneumatic spring is disposed between the first bracket and the second bracket.

16. The system of claim 9, wherein the downward force on the drive axle is approximately 4,000 pounds.

17. The system of claim 9, wherein the downward force on the drive axle is approximately 8,000 to 12,000 pounds.

\* \* \* \* \*